Nov. 1, 1932.  A. RIENERTH  1,886,226
DIFFERENTIAL FOR AUTOMOBILES
Filed Dec. 7, 1929
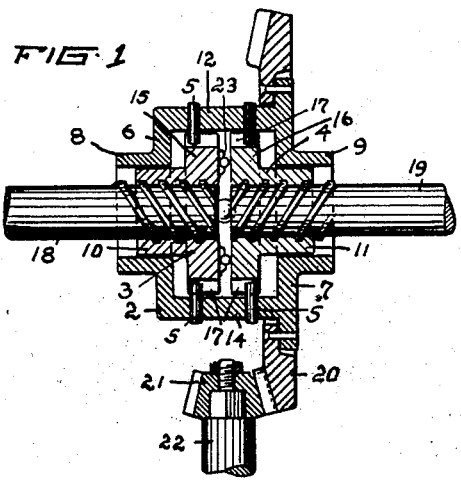
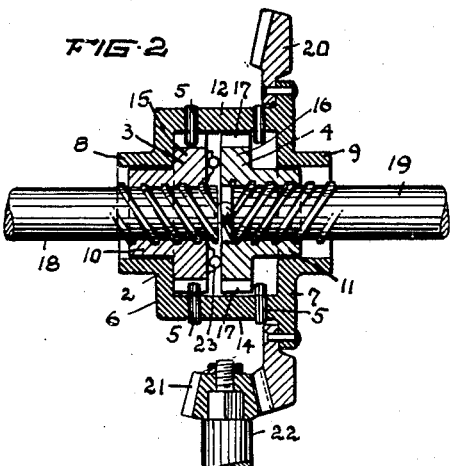
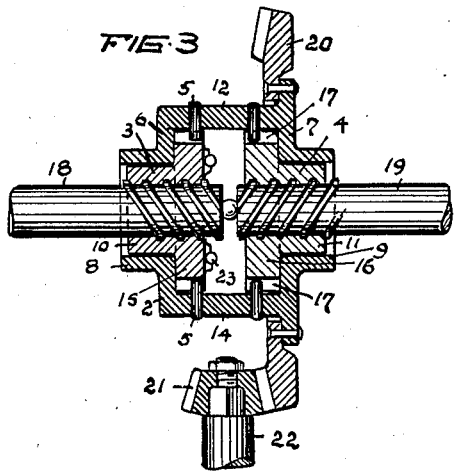
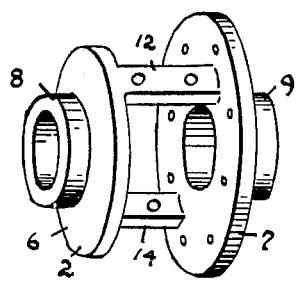
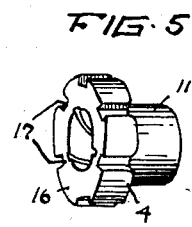
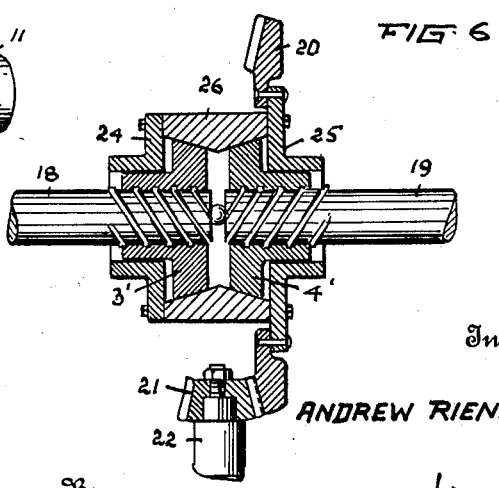
Inventor
ANDREW RIENERTH
By
Gustav A. Wolff
Attorney Patented Nov. 1, 1932

1,886,226

UNITED STATES PATENT OFFICE

ANDREW RIENERTH, OF CLEVELAND, OHIO

DIFFERENTIAL FOR AUTOMOBILES

Application filed December 7, 1929. Serial No. 412,298.

This invention relates to automobile drive axles, having two aligned drive shafts differentially coupled with each other, and more particularly to the differential connection of the drive shafts of an automobile axle. The general object of my invention is to provide a differential connection of the two drive shafts of an automobile axle adapted to rigidly lodge such drive shafts with each other when the automobile is traveling straight ahead, and to automatically dislodge such drive shafts from each other when the automobile is turning or traveling in a curve. Another object of the invention is to provide a differential connection which, for backward movement of the automobile, that is, for reverse turning of the automobile axle, automatically lodges the drive shafts rigidly with each other, an arrangement prohibiting spinning of a wheel and assuring full use of the motor power when a motor vehicle is stuck in mud or snow. Still another object of my invention is to provide a differential connection of simple form and sturdy construction without any gearing (pinions and side gears) and cheap in material and manufacturing costs.

With these and other objects in view, my invention consists in certain construction and combination of parts as will hereinafter be fully described and claimed in the annexed specification, and illustrated in the accompanying drawing, which forms a part of this application.

In the drawing, Fig. 1 is a longitudinal sectional view of a rear axle of an automobile including my new differential connection, the position of the sliding collars being shown for straight forward travel of the automobile, a movement for which the two shafts of the axle are rigidly lodged with each other.

Fig. 2 shows a longitudinal sectional view similar to Fig. 1 the sliding collars being shown in a position for right turn of an automobile.

Fig. 3 shows a sectional view similar to Figs. 1 and 2, the sliding collars being shown in a position for backward travel of the automobile.

Fig. 4 shows a perspective view of the cage of the differential and

Fig. 5 one of the two sliding collars, to be inserted into and cooperating with the cage shown in Fig. 4.

Fig. 6 shows a longitudinal sectional view of a modified form of the invention.

In the embodiment of my invention selected for illustrating the same, the differential connection includes a cage or housing 2, sliding collars 3 and 4, slidingly and rotatably mounted within said cage and pin members 5 rigidly attached to cage 2 and engageable by collars 3 and 4. Cage 2 bears at its front and rear walls 6 and 7 hollow extensions or hub portions 8 and 9 drilled to support the hub portions 10 and 11 on collars 3 and 4 respectively and cage 2 is open at its side portions to facilitate assembly proceedings of the differential connection. The connecting portions 12 and 14 of front and rear walls 6 and 7 are perforated to seat pin or finger members 5, rigidly inserted in such perforations. Collar members 3 and 4 include cylindrical head portions 15, and 16 respectively having at their peripheral areas slots 17 sized to cooperate with pins 5 to permit lateral shifting of the collars while prohibiting rotatable movement thereof when pins 5 and slots 17 cooperate, and collar members 3—4 are furthermore centrally drilled and internally screw-threaded for cooperation with the similarly screw-threaded ends of drive shafts 18 and 19 to be connected with each other by the differential connection. Cage 2 and head portions 15 and 16 of collars 3 and 4 respectively are so dimensioned and pins 5 so located that simultaneous lateral movement of the collars to one or the other side disengages pins 5 from the slots 17 of collar 3 or 4. Thus, as shown in Fig. 2, collar 3 is engaged by pins 5 while collar 4 is free from its corresponding pins 5 and may readily and freely rotate with shaft 19. If both collars are simultaneously shifted in opposite directions, the collars meet approximately in the center of cage 2 or engage the inner sides of the front and rear walls 6 and 7 and in both cases the differential connection between shafts 18 and 19 is rigid and both shafts form a solid axle together, see Figs. 1 and 3. Rear wall 7 of cage 2 supports a main drive gear 20 engaged by drive pinion 21 on drive shaft 22 coupled with the engine of the automobile. Any power applied to drive shaft 22 is transmitted over gear 20 to cage 2, and thereafter over pins 5 to collars 3 and 4 respectively, which submit such power to shafts 18 and 19 respectively by means of the screw-threaded portions on collars 3 and 4 and shafts 18 and 19. The shafts 18 and 19 being oppositely threaded, left and right hand threads during forward travel of the automobile tend to force the collars rigidly together and a thrust bearing 23 attached to collar 3 prevents interlocking of the collars with each other.

The action of the differential connection is not quite the same as the action of a differential with pinions and side gears and may rather be compared with the action of a clutch which permits disconnection of one drive shaft when the automobile is driving through a curve. The wheel and its shaft retarded in speed while driving through a curve will always be disconnected and thereby be permitted to rotate freely and such disconnection is induced by and begins with the retarding of the rotation of one wheel with respect to the other.

Operation of drive shaft 22 in opposite direction induces lateral shifting of collar members 3 and 4, to the position shown in Fig. 3, a position changing the differential connection of the shafts to a solid axle.

It is to be understood that lateral travel of collar members 3 and 4 should be restricted as much as possible and for such purpose it has been found profitable to use the modified structure shown in Fig. 6, where no pins and slots are used to achieve the results aimed at.

In this structure the cage preferably formed with a front cover member 24 and a rear cover member 25, includes an internally double cone-shaped ring 26, the cone surfaces of which cooperate with correspondingly cone-shaped collar members 3'—4' to lock shafts 18 and 19 with the cage and thereby establish the desired power connection. Otherwise the structure is of similar shape and form to the structure previously described.

What I claim is:

1. A differential motion mechanism, comprising a rotatable cage having hub portions on opposite sides, a driving shaft for said cage, two separate driven shafts mounting said cage extending through said hub portions thereof, left and right-handed threads on the opposed ends of said driven shafts, a collar for each of said driven shafts screw-connected with the threaded end thereof and rotatable and axially shiftable with respect to said cage, an extension on each of said collars to rotatably mount said collar within one hub portion of said cage, locking means for said collars on said cage and means on said collars co-operating with said locking means to interlock said collars with said cage when axially shifted to predetermined positions and to permit continuous free rotation of one of said collars when said collars are shifted to other predetermined positions.

2. A differential motion mechanism according to claim 1, whereby said locking means consists of two rows of pins, one for each of said collars, extending from the outside of said cage into its interior and slots in the peripheral wall of said collars co-operating with said pins and whereby said rows of pins are laterally spaced to permit disengagement of one row of pins with its co-operating collar when the other row of said pins is interlocked with its collar.

In testimony whereof I affix my signature.

ANDREW RIENERTH.